United States Patent
Stone et al.

(10) Patent No.: US 12,173,614 B1
(45) Date of Patent: Dec. 24, 2024

(54) TEST ROTOR BLADE FOR AN AIRCRAFT ENGINE BLADE-OFF TEST

(71) Applicant: Pratt & Whitney Canada Corp., Longueuil (CA)

(72) Inventors: Paul Stone, Guelph (CA); Dikran Mangardich, Richmond Hill (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/238,319

(22) Filed: Aug. 25, 2023

(51) Int. Cl.
  F01D 5/30 (2006.01)
  F01D 5/14 (2006.01)
  F01D 21/00 (2006.01)
  F01D 21/04 (2006.01)

(52) U.S. Cl.
  CPC ............. *F01D 5/141* (2013.01); *F01D 5/147* (2013.01); *F01D 5/30* (2013.01); *F01D 21/00* (2013.01); *F01D 21/003* (2013.01); *F01D 21/045* (2013.01); *F05D 2220/323* (2013.01); *F05D 2260/83* (2013.01)

(58) Field of Classification Search
  CPC . F01D 5/141; F01D 5/147; F01D 5/30; F01D 21/00; F01D 21/003; F01D 21/045; F05D 2220/323; F05D 2260/83
  See application file for complete search history.

(56) References Cited

U.S. PATENT DOCUMENTS

| | | | | |
|---|---|---|---|---|
| 3,817,657 A | * | 6/1974 | Hueber | F01D 5/021 416/244 R |
| 4,047,837 A | * | 9/1977 | Hueber | F01D 5/081 416/193 A |
| 5,314,307 A | * | 5/1994 | Farmer | F01D 5/3007 416/61 |
| 9,835,047 B2 | | 12/2017 | Whitehead | |
| 2015/0330246 A1 | * | 11/2015 | Whitehead | F01D 5/3007 29/889.6 |
| 2017/0010077 A1 | * | 1/2017 | Medina | F42B 15/38 |
| 2018/0016934 A1 | * | 1/2018 | Hall | F01D 21/045 |
| 2018/0017065 A1 | * | 1/2018 | Hall | F01D 21/045 |

FOREIGN PATENT DOCUMENTS

CN 115683643 A 2/2023

* cited by examiner

*Primary Examiner* — David E Sosnowski
*Assistant Examiner* — Theodore C Ribadeneyra
(74) *Attorney, Agent, or Firm* — Getz Balich LLC (57) ABSTRACT

A test rotor blade includes a blade body and a plug. The blade body extends between and to a leading edge and a trailing edge. The blade body forms a first side surface and a second side surface. The blade body forms a hole. The blade body includes a first side wall and a second side wall. The first side wall extends between and to the hole and the first side surface. The second side wall extends between and to the hole and the second side surface. The plug is disposed within the hole. The plug forms a perimeter surface extending about the axial centerline. The perimeter surface includes a sealing surface portion and a diverging surface portion. The diverging surface portion forms a gap between the plug and the blade body. The gap is disposed between the first side wall and the diverging surface portion.

19 Claims, 8 Drawing Sheets

TEST ROTOR BLADE FOR AN AIRCRAFT ENGINE BLADE-OFF TEST

TECHNICAL FIELD

This disclosure relates generally to blade-off tests for aircraft engine rotors and, more particularly, to a test rotor blade configured for use in a blade-off test for an aircraft engine rotor.

BACKGROUND OF THE ART

A bladed rotor for an aircraft engine (e.g., a gas turbine engine) may include a plurality of rotor blades distributed about the bladed rotor. Aircraft engine testing may, in some cases, include the performance of a blade-off test for a bladed rotor. The blade-off test evaluates a response of the aircraft engine to a blade-off event in which at least a portion of a rotor blade separates from the bladed rotor during bladed rotor operation. The blade-off test may be performed using a test rotor blade configured to be selectively separated (e.g., fractured) to initiate a blade-off event. Various test rotor blade configurations and blade-off tests processes are known in the art While the known configurations and processes have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a test rotor blade for an aircraft engine bladed rotor includes a blade body and a plug. The blade body extends between and to a base end and a tip end. The blade body extends between and to a leading edge and a trailing edge. The blade body forms a first side surface and a second side surface. Each of the first side surface and the second side surface extend from the leading edge to the trailing edge. The blade body forms a hole extending between the leading edge and the trailing edge. The blade body includes a first side wall and a second side wall. The first side wall extends between and to the hole and the first side surface. The second side wall extends between and to the hole and the second side surface. The plug is disposed within the hole. The plug extends along an axial centerline of the plug from a first plug end to a second plug end. The plug forms a perimeter surface extending about the axial centerline. The perimeter surface includes a sealing surface portion and a diverging surface portion. The sealing surface portion contacts the blade body within the hole. The diverging surface portion forms a gap between the plug and the blade body. The gap is disposed between the first side wall and the diverging surface portion.

In any of the aspects or embodiments described above and herein, the first side surface may be a pressure side surface of the blade body and the second side surface may be a suction side surface of the blade body.

In any of the aspects or embodiments described above and herein, the first side surface may be a suction side surface of the blade body and the second side surface may be a pressure side surface of the blade body.

In any of the aspects or embodiments described above and herein, the plug may have a diameter. The gap may have a height. The height may be less than or equal to ten percent of the diameter.

In any of the aspects or embodiments described above and herein, the diverging surface portion may be a flat surface.

In any of the aspects or embodiments described above and herein, the test rotor blade may further include a sacrificial material body disposed in the gap.

In any of the aspects or embodiments described above and herein, the diverging surface portion may extend from the first plug end to the second plug end.

In any of the aspects or embodiments described above and herein, the blade body may form a first pocket and a second pocket. The first pocket may be disposed at the leading edge. The second pocket may be disposed at the trailing edge. The hole may extend between and connect the first pocket and the second pocket.

In any of the aspects or embodiments described above and herein, the blade body may form a groove on the first side surface. The diverging surface portion may face the groove.

In any of the aspects or embodiments described above and herein, the test rotor blade may further include a thermite thermal charge disposed within the hole.

According to another aspect of the present disclosure, a gas turbine engine for an aircraft propulsion system includes a compressor. The compressor includes a bladed compressor rotor. The bladed compressor rotor includes a plurality of rotor blades. The plurality of rotor blades includes a test rotor blade. The test rotor blade includes a blade body and a plug. The blade body extends between and to a base end and a tip end. The blade body extends between and to a leading edge and a trailing edge. The blade body forms a pressure side surface and a suction side surface. Each of the pressure side surface and the suction side surface extend from the leading edge to the trailing edge. The blade body forms a hole extending between the leading edge and the trailing edge. The blade body includes a pressure side wall and a suction side wall. The pressure side wall extends between and to the pressure side surface and the hole. The suction side wall extends between and to the suction side surface and the hole. The plug is disposed within the hole. The plug forms a gap between the plug and the blade body. The gap is disposed between the plug and the pressure side wall or the suction side wall.

In any of the aspects or embodiments described above and herein, the plug may have a first cross-sectional area. The gap may have a second cross-sectional area. The first cross-sectional area may be at least fifteen times greater than the second cross-sectional area.

In any of the aspects or embodiments described above and herein, the plug may form a perimeter surface. The perimeter surface may include a sealing surface portion and a diverging surface portion. The sealing surface portion may contact the blade body within the hole. The diverging surface portion may form the gap.

In any of the aspects or embodiments described above and herein, the diverging surface portion may be a flat surface.

In any of the aspects or embodiments described above and herein, the diverging surface portion may be a curved surface. A first curvature of the curved surface may be different than a second curvature of the sealing surface portion.

According to another aspect of the present disclosure, a test rotor blade for an aircraft engine bladed rotor includes a blade body and a plug. The blade body forms a hole. The blade body includes a first side wall and a second side wall. The first side wall forms a portion of the hole. The second side wall forms another portion of the hole. The plug is disposed within the hole. The plug extends along an axial centerline of the plug from a first plug end to a second plug end. The plug has a diameter. The plug forms a perimeter surface extending about the axial centerline. The perimeter surface includes a sealing surface portion and a diverging surface portion. The sealing surface portion contacts the blade body within the hole. The diverging surface portion forms a gap between the plug and the blade body. The diverging surface portion is a flat surface. The gap is disposed between the first side wall and the diverging surface portion. The gap has a height extending between and to the diverging surface portion and the first side wall. The height is less than or equal to ten percent of the diameter.

In any of the aspects or embodiments described above and herein, the first side wall may form a pressure side surface of the blade body and the second side wall may form a suction side surface of the blade body.

In any of the aspects or embodiments described above and herein, the first side wall may form a suction side surface of the blade body and the second side wall may form a pressure side surface of the blade body.

In any of the aspects or embodiments described above and herein, the blade body may form a groove on the first side surface. The diverging surface portion may face the groove.

In any of the aspects or embodiments described above and herein, the test rotor blade may further include a sacrificial material body disposed in the gap. The sacrificial material body may be disposed on the diverging surface portion and the first side wall.

The present disclosure, and all its aspects, embodiments and advantages associated therewith will become more readily apparent in view of the detailed description provided below, including the accompanying drawings.

DETAILED DESCRIPTION

Figure 1:
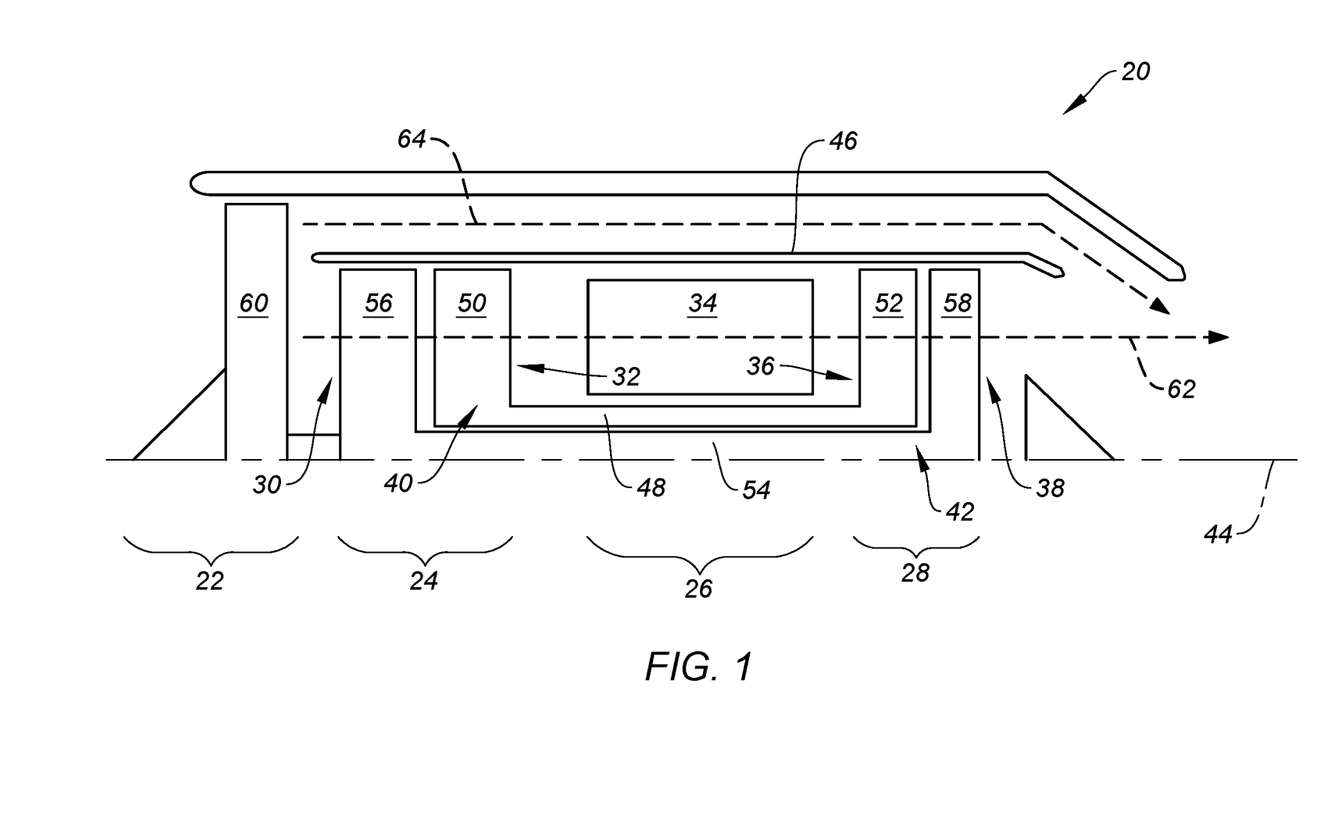
FIG. 1 schematically illustrates a cutaway, side view of a gas turbine engine for an aircraft propulsion system, in accordance with one or more embodiments of the present disclosure.

FIG. 1 schematically illustrates a gas turbine engine 20. The gas turbine engine 20 of FIG. 1 is a multi-spool turbofan gas turbine engine for an aircraft propulsion system. However, while the following description and accompanying drawings may refer to the turbofan gas turbine engine 20 of FIG. 1 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine. Moreover, the present disclosure may also be equally applicable to rotational equipment other than gas turbine engines.

The gas turbine engine 20 of FIG. 1 includes a fan section 22, a compressor section 24, a combustor section 26, and a turbine section 28. For example, the compressor section 24 of FIG. 1 includes a low-pressure compressor (LPC) 30 and a high-pressure compressor (HPC) 32, the combustor section 16 includes a combustor 34 (e.g., an annular combustor), and the turbine section 28 includes a high-pressure turbine (HPT) 36 and a low-pressure turbine (LPT) 38.

The gas turbine engine 20 sections 22, 24, 28 form a first rotational assembly 40 (e.g., a high-pressure spool) and a second rotational assembly 42 (e.g., a low-pressure spool) of the gas turbine engine 20. The first rotational assembly 40 and the second rotational assembly 42 are mounted for rotation about a rotational axis 44 (e.g., an axial centerline of the gas turbine engine 20) relative to the engine static structure 46 of the gas turbine engine 20. The engine static structure 46 may include one or more engine cases, cowlings, bearing assemblies, and/or other non-rotating structures configured to house and/or support components of the gas turbine engine 20 sections 22, 24, 26, 28.

The first rotational assembly 40 includes a first shaft 48, a bladed first compressor rotor 50 for the high-pressure compressor 32, and a bladed first turbine rotor 52 for the high-pressure turbine 36. The first shaft 48 interconnects the bladed first compressor rotor 50 and the bladed first turbine rotor 52.

The second rotational assembly 42 includes a second shaft 54, a bladed second compressor rotor 56 for the low-pressure compressor 30, and a bladed second turbine rotor 58 for the low-pressure turbine 38. The second shaft 54 interconnects the bladed second compressor rotor 56 and the bladed second turbine rotor 58. The second shaft 54 of FIG. 1 additionally interconnects the bladed second compressor rotor 56 and the bladed second turbine rotor 58 with a bladed fan rotor 60 for the fan section 22. The second shaft 54 may alternatively be coupled to the bladed fan rotor 60 (e.g., an input shaft of the bladed fan rotor 60) by a reduction gear assembly configured to drive the bladed fan rotor 60 at a reduced rotational speed relative to the second shaft 54.

In operation of the gas turbine engine 20 of FIG. 1, ambient air is directed through the fan section 22 and into a core flow path 62 and a bypass flow path 64 by rotation of the bladed fan rotor 60. Airflow along the core flow path 62 is compressed by the low-pressure compressor 30 and the high-pressure compressor 32, mixed and burned with fuel in the combustor 34, and then directed through the high-pressure turbine 36 and the low-pressure turbine 38. The bladed first turbine rotor 52 and the bladed second turbine rotor 58 rotationally drive the first rotational assembly 40 and the second rotational assembly 42, respectively, in response to the combustion gas flow through the high-pressure turbine 36 and the low-pressure turbine 38. The first shaft 48 and the second shaft 54 are concentric and rotate about the rotational axis 44. The present disclosure, however, is not limited to concentric configurations of the first shaft 48 and the second shaft 54 and the first shaft 48 and the second shaft 54 may alternatively be configured for rotation about discrete rotational axes.

Figure 2:
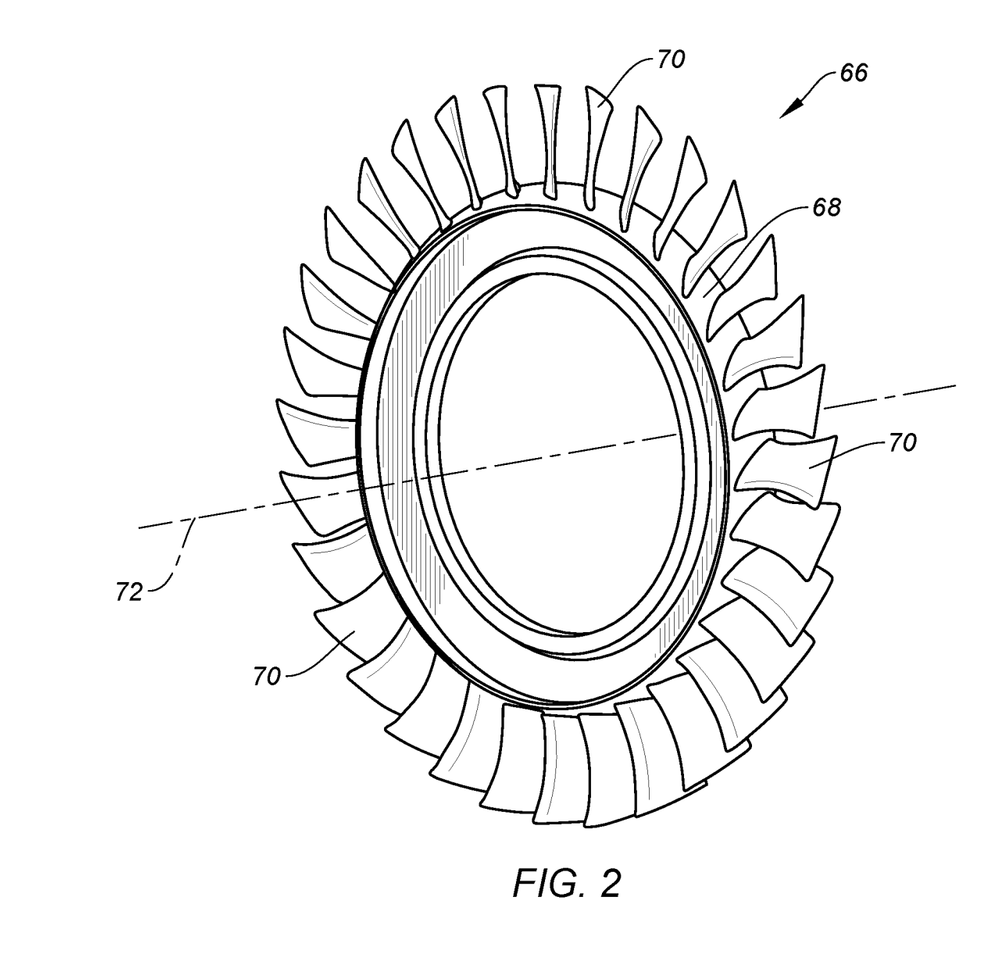
FIG. 2 illustrates perspective view of a bladed rotor for a gas turbine engine, in accordance with one or more embodiments of the present disclosure.

FIG. 2 illustrates a perspective view of an exemplary configuration of a bladed rotor 66. In particular, a bladed rotor, such as the bladed rotor 66 of FIG. 2, may be configured for use with the low-pressure compressor 30 (e.g., the bladed second compressor rotor 56), the high-pressure compressor 32 (e.g., the bladed first compressor rotor 50), and/or the bladed fan rotor 60 of the gas turbine engine 20 of FIG. 1. The bladed rotor 66 of FIG. 2 includes a disk 68 and a plurality of blades 70. The disk 68 extends circumferentially about (e.g., completely around) an axial centerline 72 (e.g., a rotational axis). The plurality of blades 70 are circumferentially distributed about the disk 68. The plurality of blades 70 are mounted to the disk 68 (e.g., to a radial periphery of the disk 68). Each of the plurality of blades 70 may be positioned within an axially extending slot (e.g., a dovetail slot) formed by the disk 68. Alternatively, the plurality of blades 70 may be formed with the disk 68 as a unitary component (e.g., an integrated blade rotor (IBR) or blisk). The present disclosure, however, is not limited to any particular mounting configuration of the plurality of blades 70 on the disk 68.

Figure 3:
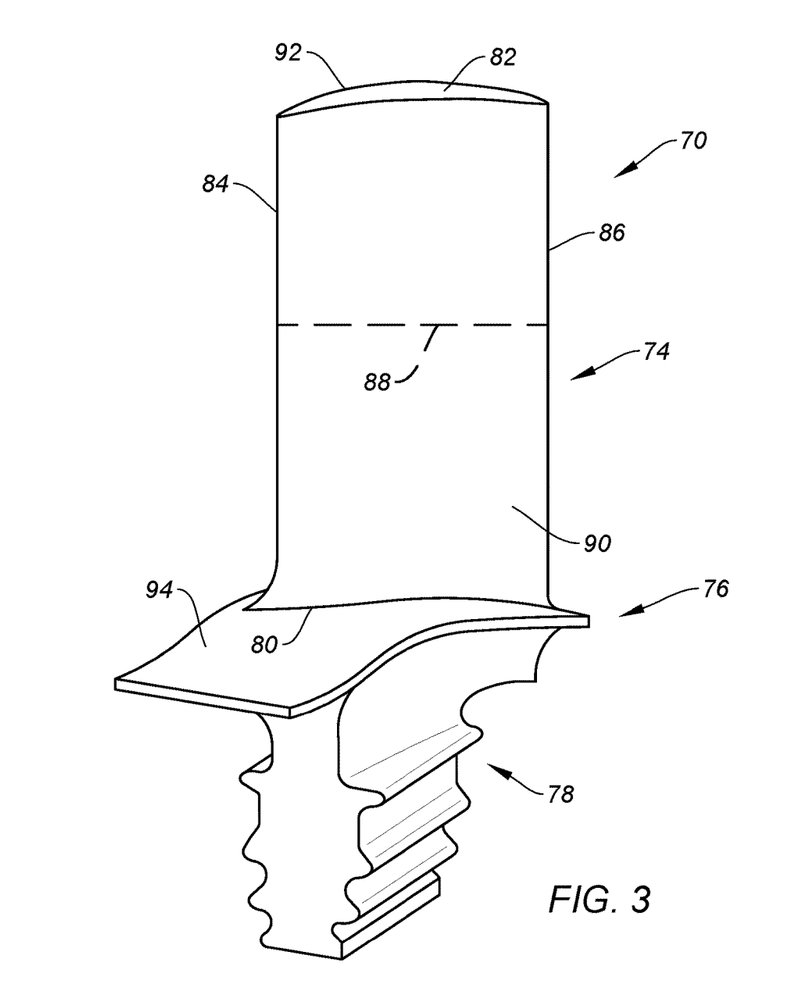
FIG. 3 illustrates a perspective view of a rotor blade for a bladed rotor, in accordance with one or more embodiments of the present disclosure.

FIG. 3 illustrates a perspective view of an exemplary configuration for one of the blades 70. The blade 70 of FIG. 3 includes a blade body 74, a platform 76, and a root 78.

The blade body 74 extends between and to a base end 80 of the blade body 74 and a tip end 82 of the blade body 74. The base end 80 is mounted to or otherwise disposed at (e.g., on, adjacent, or proximate) the platform 76. The tip end 82 is an outer radial end of the blade 70 relative to the axial centerline 72 (see FIG. 2). The blade body 74 extends between and to a leading edge 84 of the blade body 74 and a trailing edge 86 of the blade body 74. The leading edge 84 and the trailing edge 86 extend between and to the base end 80 and the tip end 82. The blade body 74 has a chord line 88 extending through the leading edge 84 and the trailing edge 86. The blade body 74 includes a pressure side surface 90 and a suction side surface 92. The pressure side surface 90 is disposed opposite (e.g., circumferentially opposite) the blade body 74 from the suction side surface 92. The pressure side surface 90 and the suction side surface 92 may extend between and to the base end 80 and the tip end 82. The pressure side surface 90 and the suction side surface 92 extend between and to the leading edge 84 and the trailing edge 86. The platform 76 may form a portion of an inner radial airflow surface 94 through the compressor section 24 (see FIG. 1). The root 78 is disposed radially inward of the platform 76. The root 78 is configured for mounting the blade 70 of FIG. 3 to a rotor disk, such as the disk 68 of FIG. 2.

Certification of an aircraft engine, such as the gas turbine engine 20, may include the performance of a "blade-off" test to demonstrate the capability of the aircraft engine for rotor blade containment and for subsequent rotation with bladed rotor imbalance (e.g., during an engine shutdown following the blade-off condition). In general, a blade-off test includes the intentional separation of a large portion (e.g., greater than 80 percent) of a test rotor blade (e.g., a compressor rotor blade) during operation of the aircraft engine. The performance of a blade-off test for an aircraft engine poses design challenges as there are strict requirements on the speed and kinetic energy that the separable portion of the test rotor blade must be released with during the intentional separation. Therefore, the test rotor blade should be designed such that the test rotor blade does not release the separable portion prematurely before reaching the target bladed rotor rotational speed and does release the separable portion at the target bladed rotor rotational speed.

Figure 4:
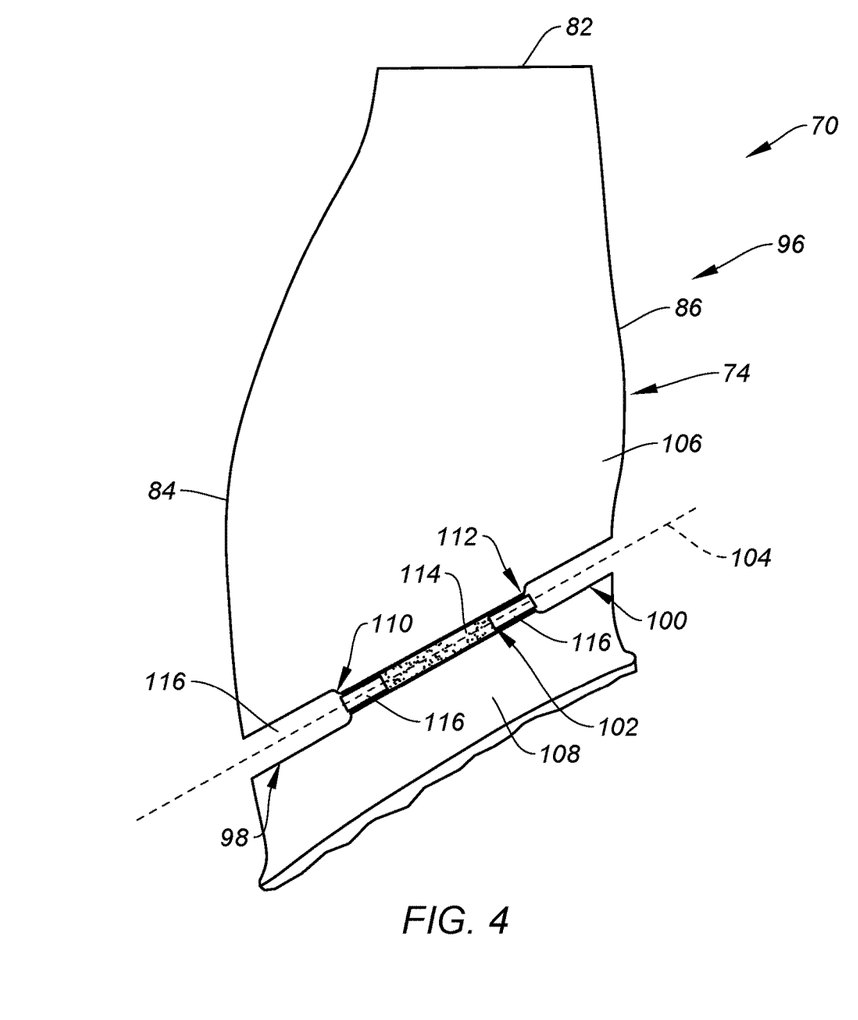
FIG. 4 illustrates a cutaway view of a test rotor blade for use on a bladed rotor during a blade-off test, in accordance with one or more embodiments of the present disclosure.

FIG. 4 illustrates a cutaway view of a test rotor blade 96 of the rotor blades 70 for use in the performance of an aircraft engine blade-off test. The blade body 74 of the test rotor blade 96 forms a leading-edge pocket 98, a trailing-edge pocket 100, and a hole 102. The leading-edge pocket 98, the trailing-edge pocket 100, and the hole 102 are oriented along a target fracture plane 104 for the test rotor blade 96. The target fracture plane 104 represents an intended location of separation of an outer radial portion 106 of the test rotor blade 96 (e.g., the blade body 74) from an inner radial portion 108 of the test rotor blade 96 (e.g., the blade body 74) at a particular radial height of the test rotor blade 96 during a blade-off test. The leading-edge pocket 98 is disposed at (e.g., on, adjacent, or proximate) the leading edge 84. The trailing-edge pocket 100 is disposed at (e.g., on, adjacent, or proximate) the trailing edge 86.

The hole 102 may extend through the blade body 74 between and to the leading-edge pocket 98 and the trailing-edge pocket 100. In particular, the hole 102 of FIG. 4 extends between and to a first end 110 of the hole 102 at the leading-edge pocket 98 and a second end 112 of the hole 102 at the trailing-edge pocket 100. The hole 102 may have a diameter which is less than respective diameters, widths, heights, etc. of the leading-edge pocket 98 and/or the trailing-edge pocket 100. The leading-edge pocket 98 and the trailing-edge pocket 100 may be formed by slots, holes, or other apertures at the leading edge 84 and the trailing edge 86, respectively. The leading-edge pocket 98 and the trailing-edge pocket 100 may be formed through the pressure side surface 90 and the suction side surface 92 at (e.g., on, adjacent, or proximate) the leading edge 84 and the trailing edge 86, respectively. However, the present disclosure is not limited to any particular relationship between the leading-edge pocket 98, the trailing-edge pocket 100, and the hole 102 diameters.

To prepare the test rotor blade 96 for an aircraft engine blade-off test, a thermal charge 114 is deposited within the hole 102. The thermal charge 114 may preferably include a thermite material. The thermite material is configured to be ignited (e.g., by an igniter installed in the test rotor blade 96) and to undergo an exothermic reduction-oxidation reaction, briefly exposing the material (e.g., titanium) of the blade body 74 at (e.g., on, adjacent, or proximate) the hole 102 to high-temperature conditions, thereby reducing the tensile properties of the blade body 74 material to effect separation of the test rotor blade 96 at a target bladed rotor rotational speed. The thermal charge 114 may alternatively include another suitable ignitable material configured to effect separation of the test rotor blade 96 at the target fracture plane 104 by heating, penetrating, weakening, melting, or otherwise degrading the material of the blade body 74 at (e.g., on, adjacent, or proximate) the hole 102. Plugs 116 may be installed into the hole 102 at the first end 110 and the second end 112 to seal the thermal charge 114 within the hole 102. One or both of the plugs 116 may include an igniter configured to selectively ignite the thermal charge 114.

Figure 5:
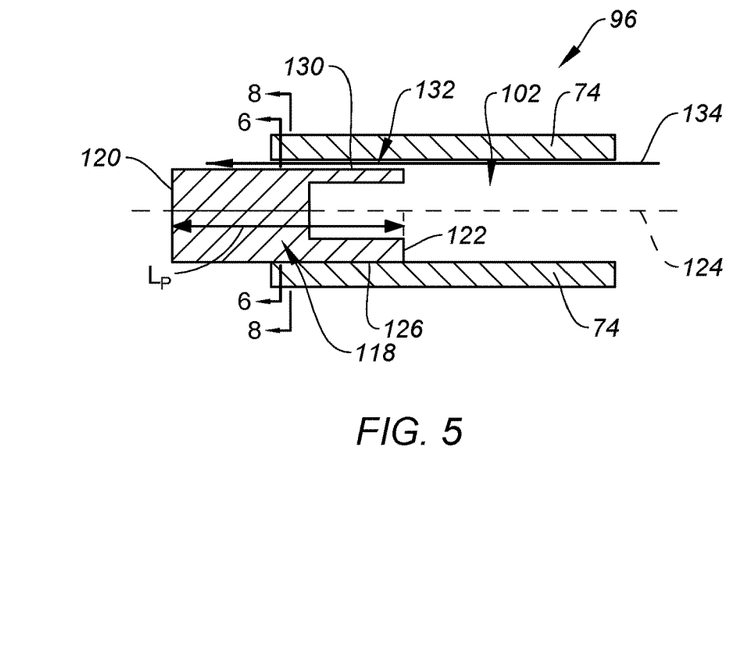
FIG. 5 illustrates a cutaway, side view of a plug for a test rotor blade, in accordance with one or more embodiments of the present disclosure.
Figure 6:
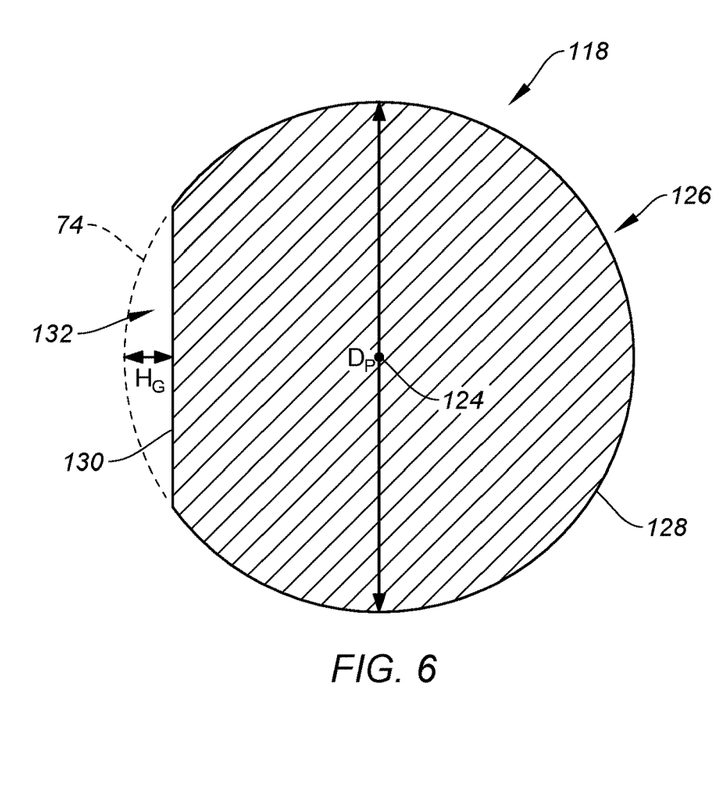
FIG. 6 illustrates a sectional view of the plug along Line 6-6 of FIG. 5, in accordance with one or more embodiments of the present disclosure.
Figure 7A:
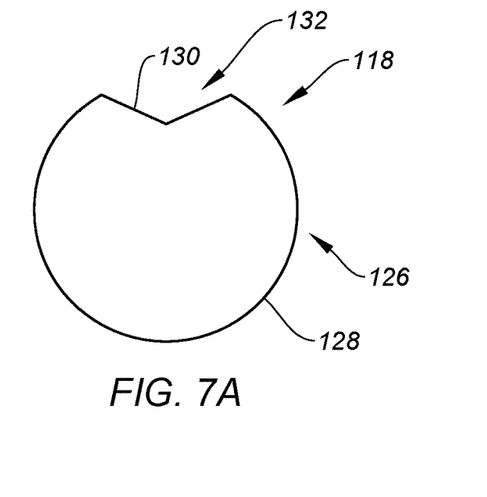
FIG. 7A-E illustrate various exemplary configurations of the plug, in accordance with one or more embodiments of the present disclosure.
Figure 7B:
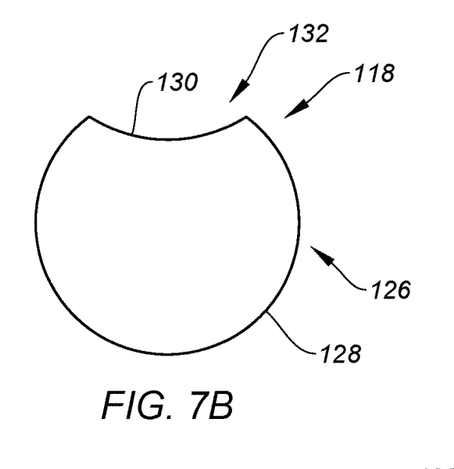
Figure 7C:
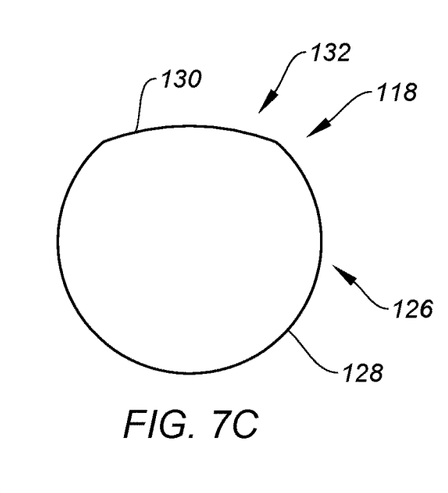
Figure 7D:
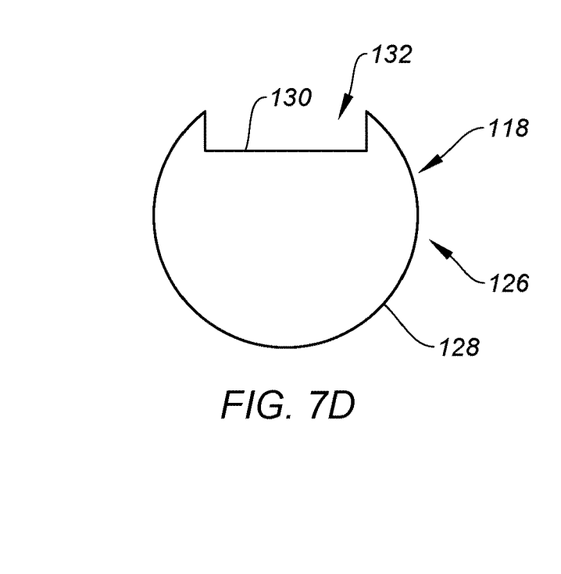
Figure 7E:
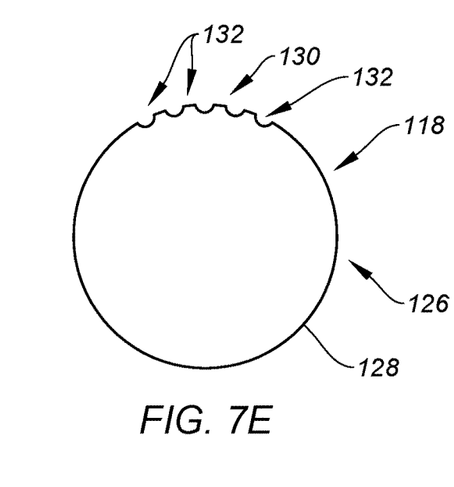

FIGS. 5 and 6 illustrate a plug 118 for the test rotor blade 96. FIG. 6 illustrates a section view of the plug 118 taken along Line 6-6 of FIG. 5. The plug 118 may be used for one or more of the plugs 116. For example, the plug 118 may be installed in the hole 102 at the first end 110 and/or the second end 112 to seal the thermal charge 114 within the hole 102. The plug 118 extends between and to a first end 120 of the plug 118 and a second end 122 of the plug 118 along an axial centerline 124 of the plug 118. The plug 118 forms a perimeter surface 126 extending about (e.g., completely around) the axial centerline 124. The perimeter surface 126 may extend between and to the first end 120 and the second end 122. The perimeter surface 126 includes a sealing surface portion 128 and a divergent surface portion 130. The sealing surface portion 128 forms the majority of the perimeter surface 126 about the axial centerline 124. The sealing surface portion 128 is shaped to correspond to a shape of the hole 102 at (e.g., on, adjacent, or proximate) the first end 110 and/or the second end 112 to sealingly engage the blade body 74 within the hole 102. For example, the sealing surface portion 128 of FIGS. 5 and 6 has a circular cross-sectional shape. However, the sealing surface portion 128 is not limited to circular cross-sectional shapes and the shape of the sealing surface portion 128 may be selected, for example, to correspond to a cross-sectional shape of the hole 102. The plug 118 of FIGS. 5 and 6 has a diameter $D_P$ extending between opposing portions of the sealing surface portion 128. The diverging surface portion 130 has a shape which diverges from the shape of the sealing surface portion 128. The diverging surface portion 130 is circumferentially bounded by the sealing surface portion 128. For example, the diverging surface portion 130 of FIGS. 5 and 6 is a flat (e.g., planar) surface extending between circumferentially opposing portions of the sealing surface portion 128. The diverging surface portion 130 of FIGS. 5 and 6 extends from the first end 120 to the second end 122. As will be discussed in further detail, however, the diverging surface portion 130 is not limited to the flat surface of FIGS. 5 and 6.

With the plug 118 installed in the hole 102, the diverging surface portion 130 forms a gap 132 between the diverging surface portion 130 and the blade body 74 within the hole 102. During performance of a blade-off test, ignition and combustion of the thermal charge 114 (see FIG. 4) generates hot gas 134. This hot gas 134 is directed through the gap 132 between the diverging surface portion 130 and the blade body 74, thereby facilitating significantly increased convective heat transfer from the hot gas 134 to the blade body 74 at (e.g., on, adjacent, or proximate) the gap 132. The gap 132 of FIGS. 5 and 6 has a height $H_G$ extending between and to the diverging surface portion 130 and the blade body 74. The height $H_G$ may be measured perpendicular to the diverging surface portion 130 as shown, for example, in FIG. 6. The height $H_G$ may be a maximum distance between the diverging surface portion 130 and the blade body 74 at a given point along an axial length $L_P$ of the plug 118 from the first end 120 to the second end 122. The position and shape of the diverging surface portion 130 may be selected such that the following inequality [1] is satisfied:

$$\frac{H_G}{D_P} \le 0.1$$

In other words, the height $H_G$ may be less than or equal to 10 percent of the diameter $D_P$. The height $H_G$ may be selected to facilitate sealing of the thermal charge 114 within the blade body 74 as well as to control a flow rate of the hot gas 134 through the gap 132 during a blade-off test. For example, a gap 132 which is greater than about 10 percent of the diameter $D_P$ may allow an appreciable amount of the thermal charge 114 to leak out of the blade body 74 prior to a blade-off test and/or reduce a flow rate of hot gas 134 through the gap 132 during a blade-off test, thereby limiting convective heat transfer from the hot gas 134 to the blade body 74.

Referring to FIGS. 7A-E, the diverging surface portion 130 may be configured to form a variety of cross-sectional shapes of the gap 132. The diverging surface portion 130 may additionally be configured to form a plurality of gaps 132 (see FIG. 7E). A shape of the gap 132 may be selected to facilitate control of a flow of the hot gas 134 through the gap 132 (see FIG. 5). For example, the shape of the gap 132 may be selected to control a flow rate of the hot gas 134 through the gap 132 or a surface area or portion of the blade body 74 exposed to the hot gas 134. The shape of the gap 132 may additionally or alternatively be selected to ensure a tight fit of the plug 118 within the blade body 74 (e.g., within the hole 102) and/or to facilitate retention of the thermal charge 114 within the blade body 74. The present disclosure, however, is not limited to foregoing exemplary diverging surfaces 130 illustrated in FIGS. 7A-E. The diverging surface portion 130 may generally be disposed at a limited circumferential portion of the perimeter surface 126 to facilitate control of the hot gas 134 along a particular portion of the blade body 74. For example, the divergent surface may form a portion of the perimeter surface 126 which is less than 25 percent of a circumference of the plug 118. Moreover, the plug 118 may have a cross-sectional area (e.g., on a plane perpendicular to the axial centerline 124) which is at least fifteen times greater than a cross-sectional area (e.g., on a plane perpendicular to the axial centerline 124) of the gap 132. This size of the gap 132 relative to the plug 118 may facilitate control of the hot gas 134 flow rate and thermal charge 114 retention, as described above.

Figure 8A:
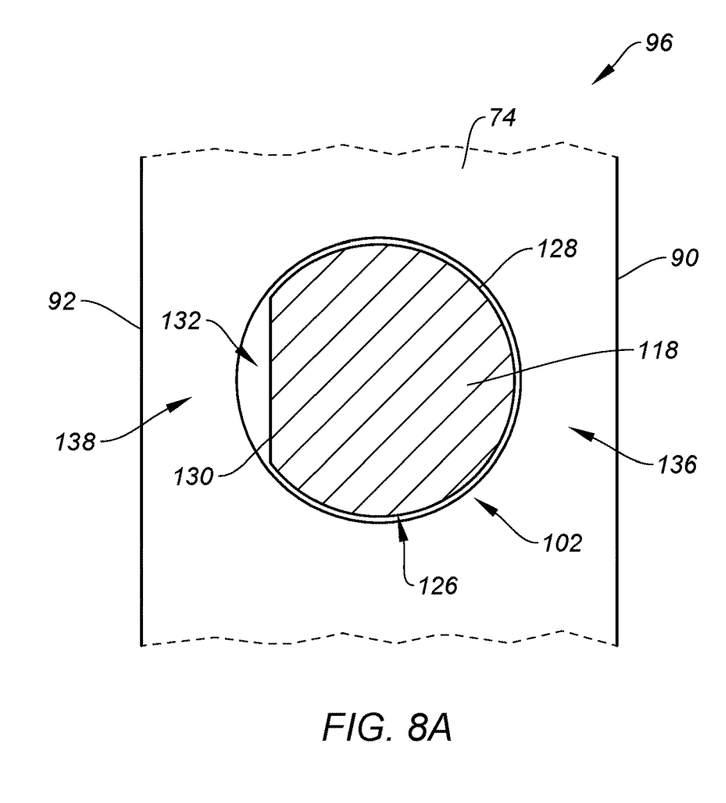
FIGS. 8A-B illustrate sectional views of the plug installed in a test rotor blade along Line 8-8 of FIG. 5, in accordance with one or more embodiments of the present disclosure.
Figure 8B:
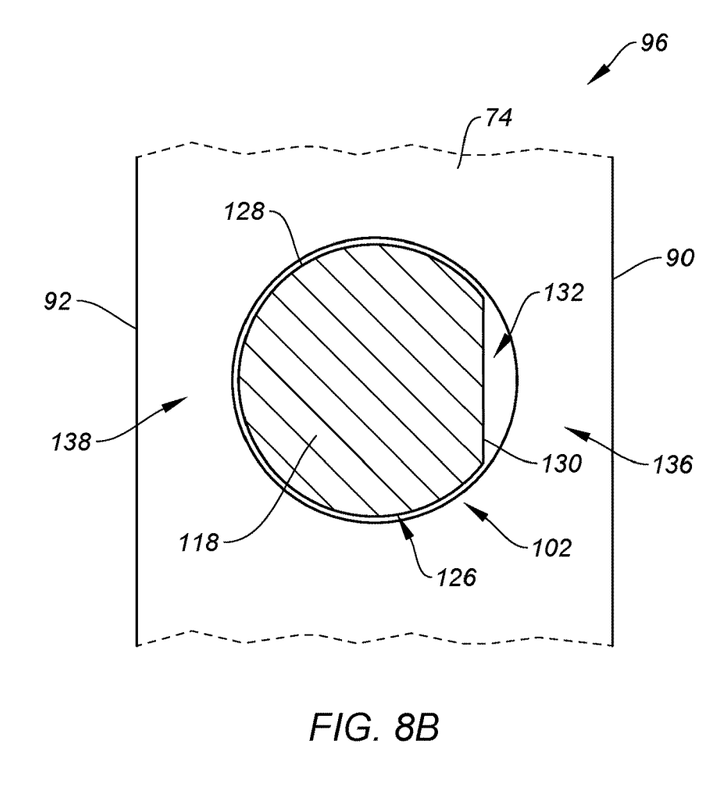

FIGS. 8A and 8B illustrate alternative sectional views of the blade body 74 and the plug 118 within the hole 102 along Line 8-8 of FIG. 5. The test rotor blade 96 (e.g., the blade body 74) includes a pressure side wall 136 and a suction side wall 138. The pressure side wall 136 extends between and to the hole 102 and the pressure side surface 90 and, thereby, forms portions of the pressure side surface 90 and the hole 102. The suction side wall 138 extends between and to the hole 102 and the suction side surface 92 and, thereby, forms portions of the suction side surface 92 and the hole 102.

Referring to FIG. 8A, the plug 118 may be disposed within the hole 102 with the diverging surface portion 130 facing the suction side wall 138. Accordingly, the gap 132 may be disposed between the diverging surface portion 130 and the suction side wall 138 to direct the hot gas 134 along the suction side wall 138 during a blade-out test.

Referring to FIG. 8B, the plug 118 may be disposed within the hole 102 with the diverging surface portion 130 facing the pressure side wall 136. Accordingly, the gap 132 may be disposed between the diverging surface portion 130 and the pressure side wall 136 to direct the hot gas 134 along the pressure side wall 136 during a blade-out test.

The pressure side wall 136 and the suction side wall 138 are shown in FIGS. 8A and 8B as having substantially equal thicknesses between the leading-edge pocket 98 and the respective one of the pressure side wall 136 and the suction side wall 138. However, the blade body 74 may alternatively be configured with one of the pressure side wall 136 or the suction side wall 138 being thinner than the other of the pressure side wall 136 or the suction side wall 138 at the hole 102. The plug 118 may be disposed within the hole 102 such that the diverging surface portion 130 faces the thinner of the pressure side wall 136 and the suction side wall 138.

Figure 9:
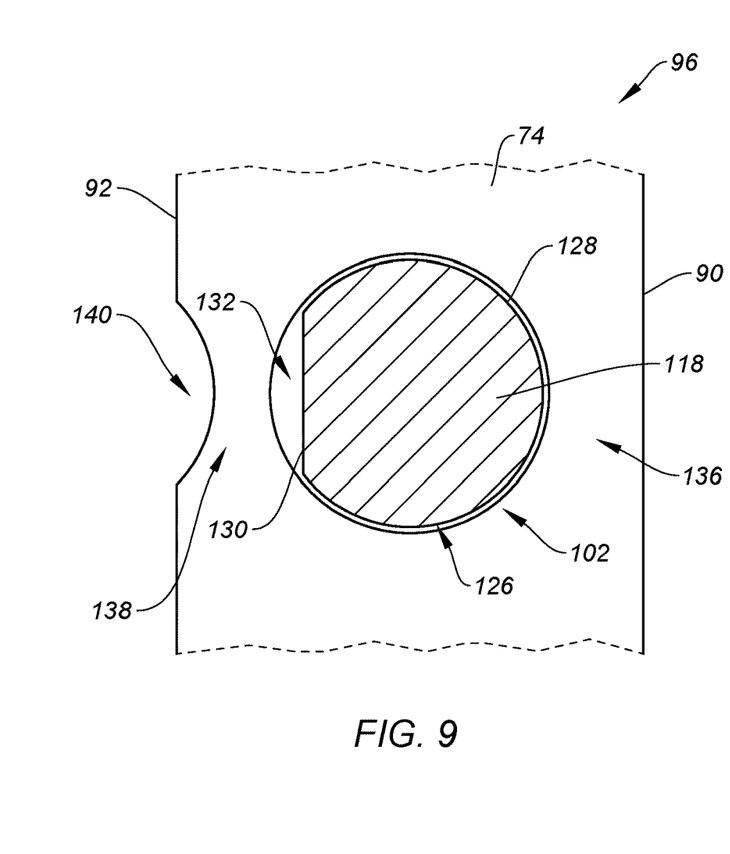
FIG. 9 illustrates a sectional view of a side wall configuration for a test rotor blade with the plug installed in the test rotor blade, in accordance with one or more embodiments of the present disclosure.

Referring to FIG. 9, in some embodiments, the pressure side wall 136 and/or the suction side wall 138 may be locally shaped to control a thickness of the pressure side wall 136 and/or the suction side wall 138 at the hole 102. For example, the pressure side wall 136 (e.g., the pressure side surface 90) and/or the suction side wall 138 (e.g., the suction side surface 92) may be machined, etched, milled, cut, abraded, or otherwise formed at a location of the target fracture plane 104 (see FIG. 4). The test rotor blade 96 of FIG. 9, for example, includes a groove 140 formed by the suction side wall 138 on the suction side surface 92 at (e.g., on, adjacent, or proximate). The plug 118 of FIG. 9 is disposed within the hole 102 with the diverging surface portion 130 facing the suction side wall 138 and the groove 140. Accordingly, the gap 132 may be disposed between the diverging surface portion 130 and the suction side wall 138 at the groove 140 to direct the hot gas 134 along the thinned portion of the suction side wall 138 during a blade-out test.

As previously discussed, the orientation of the diverging surface portion 130 of the plug 118 may be positioned to form the gap 132 between the plug 118 and a portion of the blade body 74 (e.g., the pressure side wall 136 or the suction side wall 138). The diverging surface portion 130 directs hot gas 134 generated from ignition and combustion of the thermal charge 114 (e.g., thermite) through the gap 132 exposing the material of the pressure side wall 136 or the suction side wall 138 to very high rates of convective heat transfer from the hot gas 134. Due to the rapid temperature increase, the tensile capabilities of the pressure side wall 136 or the suction side wall 138 will fall below the applied stress level (e.g., centrifugal force and other stresses applied to the blade body 74), resulting in fracturing of the blade body 74 (e.g., the pressure side wall 136 or the suction side wall 138) at (e.g., on, adjacent, or proximate) the gap 132 and along the target fracture plane 104 (see FIG. 4). Once a first of the side walls (e.g., the pressure side wall 136 or the suction side wall 138) fractures, the stresses experienced by the other side wall (e.g., the pressure side wall 136 or the suction side wall 138) significantly increase due to a reduction in the test rotor blade 96 material along the target fracture plane 104 as well as the additional bending loads applied to the test rotor blade 96 at the other side wall, thereby facilitating fracture of the other side wall and separation of the outer radial portion 106 at the target bladed rotor rotational speed. Accordingly, the present disclosure test rotor blade 96 facilitates improved reliability of the test rotor blade 96 for blade-off tests by increasing the likelihood of successful test rotor blade 96 separation at the target bladed rotor rotational speed, compared to at least some conventional rotor blades configured for blade-off tests. Moreover, the gap 132 formed by the plug 118 (e.g., the diverging surface portion 130) facilitates a reduction in internal pressure within the hole 102, thereby reducing the load applied to the plug 118 (and any mechanical fasteners which may be used to hold the plug 118), thereby reducing the risk of premature failure of the plug 118 and/or leakage of unreacted thermal charge 114 (e.g., thermite).

Figure 10:
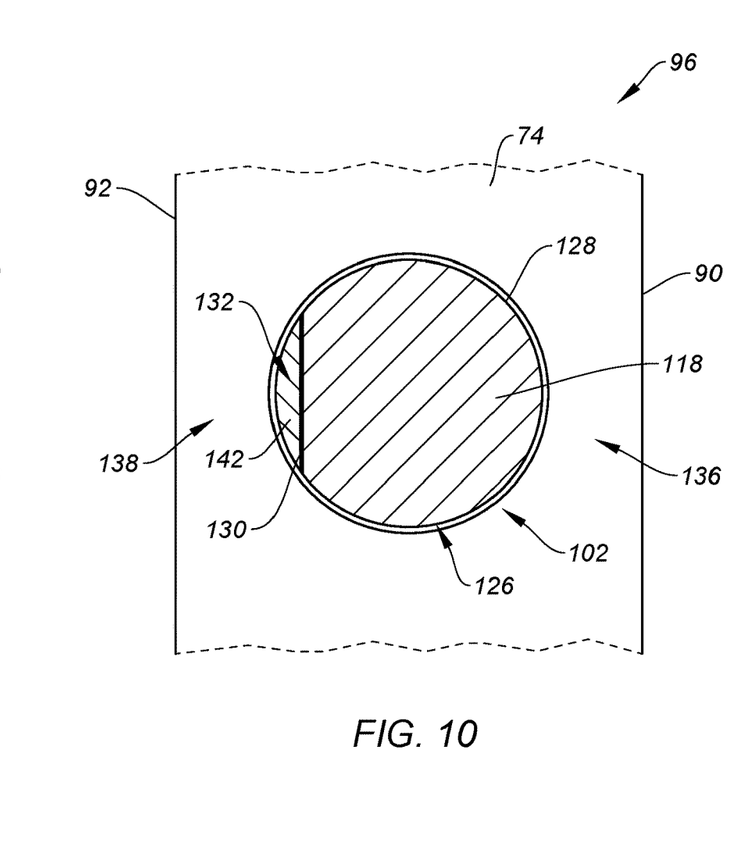
FIG. 10 illustrates a sectional view of a sacrificial material body and the plug installed in a test rotor blade, in accordance with one or more embodiments of the present disclosure.

Referring to FIG. 10, in some embodiments, the test rotor blade 96 may include a sacrificial material body 142 mounted with the plug 118 in the hole 102. The sacrificial material body 142 may be mounted to or otherwise disposed at (e.g., on, adjacent, or proximate) the diverging surface portion 130 to seal or substantially seal the gap 132. The sacrificial material body 142 may be formed all or in substantial part by wax or another moldable material having a melting point substantially below the temperatures created by ignition of the thermal charge 114. The sacrificial material body 142 may seal the gap 132 to prevent quantities of the thermal charge 114 from escaping from the blade body 74. At initiation of a blade-off test, the hot gas 134 (see FIG. 5) may quickly melt the sacrificial material body 142 allowing the diverging surface portion 130 to direct the hot gas 134 through the gap 132.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts, and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A test rotor blade for an aircraft engine bladed rotor, the test rotor blade comprising:
   a blade body, the blade body extends between and to a base end and a tip end, the blade body extends between and to a leading edge and a trailing edge, the blade body forms a first side surface and a second side surface, each of the first side surface and the second side surface extend from the leading edge to the trailing edge, the blade body forms a hole extending between the leading edge and the trailing edge, the blade body includes a first side wall and a second side wall, the first side wall extends between and to the hole and the first side surface, and the second side wall extends between and to the hole and the second side surface; and
   a plug disposed within the hole, the plug extends along an axial centerline of the plug from a first plug end to a second plug end, the plug forms a perimeter surface extending about the axial centerline, the perimeter surface includes a sealing surface portion and a diverging surface portion, the sealing surface portion contacts the blade body within the hole, the diverging surface portion forms a gap between the plug and the blade body, and the gap is disposed between the first side wall and the diverging surface portion;
   wherein the plug has a diameter, the gap has a height, and the height is less than or equal to ten percent of the diameter.

2. The test rotor blade of claim 1, wherein the first side surface is a pressure side surface of the blade body and the second side surface is a suction side surface of the blade body.

3. The test rotor blade of claim 1, wherein the first side surface is a suction side surface of the blade body and the second side surface is a pressure side surface of the blade body.

4. The test rotor blade of claim 1, wherein the diverging surface portion is a flat surface.

5. The test rotor blade of claim 1, further comprising a sacrificial material body disposed in the gap.

6. The test rotor blade of claim 1, wherein the diverging surface portion extends from the first plug end to the second plug end.

7. The test rotor blade of claim 1, wherein the blade body forms a first pocket and a second pocket, the first pocket is disposed at the leading edge, the second pocket is disposed at the trailing edge, and the hole extends between and connects the first pocket and the second pocket.

8. The test rotor blade of claim 1, wherein the blade body forms a groove on the first side surface, and the diverging surface portion faces the groove.

9. The test rotor blade of claim 1, further comprising a thermite thermal charge disposed within the hole.

10. A gas turbine engine for an aircraft propulsion system, the gas turbine engine comprising:
    a compressor including a bladed compressor rotor, the bladed compressor rotor includes a plurality of rotor blades, the plurality of rotor blades includes a test rotor blade, the test rotor blade includes:
      a blade body, the blade body extends between and to a base end and a tip end, the blade body extends between and to a leading edge and a trailing edge, the blade body forms a pressure side surface and a suction side surface, each of the pressure side surface and the suction side surface extend from the leading edge to the trailing edge, the blade body forms a hole extending between the leading edge and the trailing edge, the blade body includes a pressure side wall and a suction side wall, the pressure side wall extends between and to the pressure side surface and the hole, and the suction side wall extends between and to the suction side surface and the hole; and
      a plug disposed within the hole, the plug forms a gap between the plug and the blade body, and the gap is disposed between the plug and the pressure side wall or the suction side wall;
      wherein the plug has a first cross-sectional area, the gap has a second cross-sectional area, and the first cross-sectional area is at least fifteen times greater than the second cross-sectional area.

11. The gas turbine engine of claim 10, wherein the plug forms a perimeter surface, the perimeter surface includes a sealing surface portion and a diverging surface portion, the sealing surface portion contacts the blade body within the hole, and the diverging surface portion forms the gap.

12. The gas turbine engine of claim 11, wherein the diverging surface portion is a flat surface.

13. The gas turbine engine of claim 11, wherein the diverging surface portion is a curved surface, and a first curvature of the curved surface is different than a second curvature of the sealing surface portion.

14. A test rotor blade for an aircraft engine bladed rotor, the test rotor blade comprising:
    a blade body, the blade body extends between and to a base end and a tip end, the blade body extends between and to a leading edge and a trailing edge, the blade body forms a first side surface and a second side surface, each of the first side surface and the second side surface extend from the leading edge to the trailing edge, the blade body forms a hole extending between the leading edge and the trailing edge, the blade body includes a first side wall and a second side wall, the first side wall extends between and to the hole and the first side surface, and the second side wall extends between and to the hole and the second side surface;
    a plug disposed within the hole, the plug extends along an axial centerline of the plug from a first plug end to a second plug end, the plug forms a perimeter surface extending about the axial centerline, the perimeter surface includes a sealing surface portion and a diverging surface portion, the sealing surface portion contacts the blade body within the hole, the diverging surface portion forms a gap between the plug and the blade body, and the gap is disposed between the first side wall and the diverging surface portion; and
    a sacrificial material body disposed in the gap.

15. The test rotor blade of claim 14, wherein the plug has a diameter, the gap has a height, and the height is less than or equal to ten percent of the diameter.

16. The test rotor blade of claim 14, wherein the first side surface is a suction side surface of the blade body and the second side surface is a pressure side surface of the blade body.

17. The test rotor blade of claim 14, wherein the blade body forms a first pocket and a second pocket, the first pocket is disposed at the leading edge, the second pocket is disposed at the trailing edge, and the hole extends between and connects the first pocket and the second pocket.

18. The test rotor blade of claim 14, wherein the blade body forms a groove on the first side surface, and the diverging surface portion faces the groove.

19. The test rotor blade of claim 14, further comprising a thermite thermal charge disposed within the hole.

* * * * *